(12) United States Patent
El Khoury et al.

(10) Patent No.: US 9,760,710 B2
(45) Date of Patent: Sep. 12, 2017

(54) PASSWORD RECOVERING FOR MOBILE APPLICATIONS

(71) Applicants: Paul El Khoury, Heidelberg (DE); Robert Lorch, Bad Schönborn (DE)

(72) Inventors: Paul El Khoury, Heidelberg (DE); Robert Lorch, Bad Schönborn (DE)

(73) Assignee: SAP SE, Walldorf (DE)

( * ) Notice: Subject to any disclaimer, the term of this patent is extended or adjusted under 35 U.S.C. 154(b) by 161 days.

(21) Appl. No.: 14/194,361

(22) Filed: Feb. 28, 2014

(65) Prior Publication Data
US 2015/0248552 A1    Sep. 3, 2015

(51) Int. Cl.
*G06F 21/45* (2013.01)
*G06F 21/31* (2013.01)
*H04L 29/06* (2006.01)

(52) U.S. Cl.
CPC .............. *G06F 21/45* (2013.01); *G06F 21/31* (2013.01); *H04L 63/083* (2013.01); *G06F 2221/2131* (2013.01)

(58) Field of Classification Search
CPC .................................................... H04L 9/0886
See application file for complete search history.

(56) References Cited

U.S. PATENT DOCUMENTS

| | | | |
|---|---|---|---|
| 6,160,891 A * | 12/2000 | Al-Salqan | H04L 9/0643 380/277 |
| 6,460,141 B1 | 10/2002 | Olden | |
| 6,549,626 B1 * | 4/2003 | Al-Salqan | H04L 9/0643 380/277 |
| 6,668,323 B1 * | 12/2003 | Challener | G06F 21/31 380/286 |
| 7,587,608 B2 | 9/2009 | Haller et al. | |
| 7,725,730 B2 | 5/2010 | Juels et al. | |
| 7,809,130 B1 | 10/2010 | Kalyadin et al. | |
| 8,380,989 B2 | 2/2013 | Sarmah et al. | |
| 8,429,760 B2 | 4/2013 | Tribble | |
| 8,490,154 B2 | 7/2013 | Gomez et al. | |

(Continued)

FOREIGN PATENT DOCUMENTS

| | | | |
|---|---|---|---|
| CA | 2864151 A1 | 8/2013 | |
| CA | WO 2013120169 A1 * | 8/2013 | ............. G06F 21/45 |

OTHER PUBLICATIONS

"PKCS" retrieved from http://en.wikipedia.org/wiki/PKCS, Aug. 9, 2013, 4 pages.

(Continued)

*Primary Examiner* — Harunur Rashid
*Assistant Examiner* — Wayne An
(74) *Attorney, Agent, or Firm* — Brake Hughes Bellermann LLP

(57) ABSTRACT

An encryption manager may encrypt mobile data associated with a mobile application executing on a mobile device, where the mobile application is configured to interact with a remote application executing on a remote server, and the mobile data is encrypted using a mobile password. A mobile password recovery manager may encrypt the mobile password, using a remote password used to access the remote application executing on the remote server, and may recover the mobile data, in case of loss of the mobile password, including decrypting the encrypted mobile password using the remote password.

20 Claims, 6 Drawing Sheets

(56) References Cited

U.S. PATENT DOCUMENTS

| | | | |
|---|---|---|---|
| 8,490,167 B2* | 7/2013 | Stecher | G06F 21/31 |
| | | | 726/19 |
| 8,549,315 B2 | 10/2013 | Read et al. | |
| 8,555,085 B2 | 10/2013 | Khoury | |
| 8,572,757 B1* | 10/2013 | Stamos | G06F 21/6209 |
| | | | 380/278 |
| 2006/0041932 A1* | 2/2006 | Cromer | H04L 9/3226 |
| | | | 726/6 |
| 2010/0122340 A1 | 5/2010 | Chow et al. | |
| 2010/0290623 A1 | 11/2010 | Banks et al. | |
| 2011/0293098 A1 | 12/2011 | Fu et al. | |
| 2012/0167225 A1 | 6/2012 | Gomez et al. | |
| 2013/0159699 A1 | 6/2013 | Torkkel et al. | |
| 2014/0101451 A1* | 4/2014 | Chan | G06F 17/30085 |
| | | | 713/171 |
| 2014/0143845 A1 | 5/2014 | Roy et al. | |

OTHER PUBLICATIONS

"PBKDF2" retrieved from http://en.wikipedia.org/wiki/PBKDF2, Jan. 3, 2014, 4 pages.

Burton S. Kaliski Jr. et al. "An Overview of the PKCS Standards", retrieved from http://citeseerx.ist.psu.edu/viewdoc/download?doi=10.1.1.29.9236&rep=rep1&type=pdf, Jun. 3, 1991, pp. 1-22.

European Search Report for EP Application No. EP 14003676 mailed Mar. 3, 2015, 8 pages.

"PKCS #5: Password-BasedEncryption Standard", An RSA Laboratories Technical Note Version 1.5, Revised Nov. 1, 1993, 8 pages.

* cited by examiner

PASSWORD RECOVERING FOR MOBILE APPLICATIONS

TECHNICAL FIELD

This description relates to password recovery techniques.

BACKGROUND

Mobile applications executing on mobile devices may often be associated with, e.g., may leverage or otherwise interact with, remote applications executing on a remote server. For example, in the business context, an enterprise server may be utilized to execute an enterprise application and to store associated enterprise data, and a mobile application on a mobile device may be configured to leverage the enterprise application/data. In this way, for example, an employee may benefit from having access to necessary enterprise resources, even when travelling or otherwise away from an office environment.

In these and similar contexts, the remote server generally has access to a wide array of security services, as well as to the necessary hardware/software resources necessary to utilize such security services. Consequently, such a remote server may be considered to be relatively secure, so that a user or operator of the remote server may be reasonably confident with respect to a confidentiality and integrity of data stored in conjunction therewith.

In contrast, mobile devices executing mobile applications which communicate with the remote server have considerably fewer resources available to implement security measures to protect data stored using the mobile device. Moreover, such mobile devices, by their nature, are prone to be lost or stolen. As a result, mobile devices are widely recognized as representing potential points of failure with respect to maintaining a confidentiality and integrity of stored data. Consequently, mobile devices and mobile applications tend to be associated with widely-publicized and well-researched attack techniques, which only compound the vulnerabilities of such mobile devices.

In scenarios such as those referenced above, the mobile application thus represents a potential point of failure with respect to maintaining the confidentiality and integrity of data stored at the remote server. Consequently, the remote application, or an administrator thereof, may enforce a password policy with respect to a mobile password used at the mobile device to access the mobile application. Such a mobile password may be used in conjunction with a remote password required to access the remote application at the remote server, and may therefore provide an additional layer of security, beyond whatever security mechanisms that may be provided by the mobile device itself.

However, in conventional implementations, it may be difficult or impossible to recover such a mobile password, in the event that the mobile password is lost or otherwise becomes unavailable to a user of the mobile device. As a result, in such situations, all data encrypted using the mobile password may become inaccessible, so that the user of the mobile device may be forced to attempt to recover or recreate such lost data. Such attempts to recover or recreate lost data are generally inconvenient at best, and futile at worst, and therefore result in increased dissatisfaction of the user of the mobile device, as well as potential losses of profit, customer dissatisfaction, and/or other disadvantages experienced by a provider of the remote application.

SUMMARY

According to one general aspect, a system may include instructions recorded on a non-transitory computer-readable medium, and executable by at least one processor. The system may include an encryption manager configured to cause the at least one processor to encrypt mobile data associated with a mobile application executing on a mobile device and configured to interact with a remote application executing on a remote server, the mobile data being encrypted using a mobile password. The system may include a mobile password recovery manager configured to cause the at least one processor to encrypt the mobile password, using a remote password used to access the remote application executing on the remote server, and recover the mobile data, in case of loss of the mobile password, including decrypting the encrypted mobile password using the remote password.

According to another general aspect, a computer-implemented method for executing instructions stored on a non-transitory computer readable storage medium may include encrypting mobile data associated with a mobile application executing on a mobile device and configured to interact with a remote application executing on a remote server, the mobile data being encrypted using a mobile password. The method may further include encrypting the mobile password, using a remote password used to access the remote application executing on the remote server, and recovering the mobile data, in case of loss of the mobile password, including decrypting the encrypted mobile password using the remote password.

According to another general aspect, a computer program product may be tangibly embodied on a non-transitory computer-readable storage medium and may include instructions that, when executed by at least one processor, are configured to encrypt mobile data associated with a mobile application executing on a mobile device and configured to interact with a remote application executing on a remote server, the mobile data being encrypted using a mobile password. The instructions, when executed by the at least one processor, may encrypt the mobile password, using a remote password used to access the remote application executing on the remote server, and may recover the mobile data, in case of loss of the mobile password, including decrypting the encrypted mobile password using the remote password.

The details of one or more implementations are set forth in the accompanying drawings and the description below. Other features will be apparent from the description and drawings, and from the claims.

DETAILED DESCRIPTION

Figure 1:
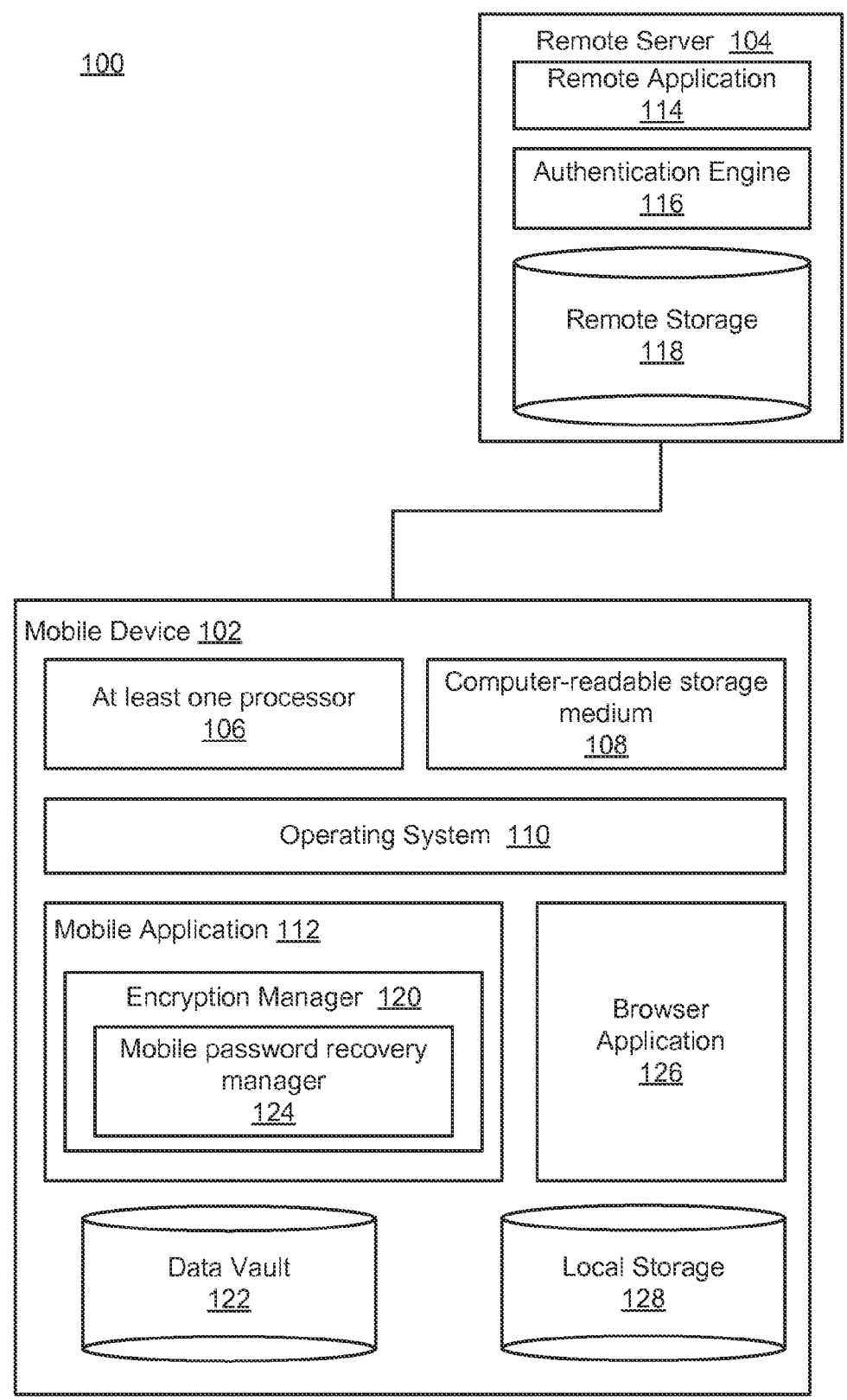
FIG. 1 is a block diagram of a system for password recovery for mobile applications.

FIG. 1 is a block diagram of a system 100 for password recovery for mobile applications. In the example of FIG. 1, a mobile device 102 is illustrated as being in communication, e.g., by way of a communications network, with a remote server 104. As referenced above, the remote server 104 may be configured to provide various services to a user of the mobile device 102, and, in so doing, may be equipped with all necessary and/or available human and computing resources required to provide such services in a secure manner. As also referenced above, in contrast, the mobile device 102 may have far fewer resources at its disposal for ensuring a security of activities and data used by the mobile device 102. Moreover, the small and portable nature of the mobile device 102 may expose the mobile device 102 to security risks which are not a concern with respect to the remote server 104.

In the example of FIG. 1, as described in detail below, it is assumed that a provider of the remote server 104 has a security interest in activities and data of the user of the mobile device 102. For example, the user of the mobile device 102 may utilize the mobile device 102 to store confidential data owned by the provider of the remote server 104, including credentials of the user of the mobile device 102 which provide access to the remote server 104 itself. Consequently, as described, the mobile device 102 represents a point of vulnerability for the provider of the remote server 104 with respect to protecting a confidentiality and integrity of data of the remote server 104.

On the other hand, the reasons for deploying the mobile device 102 include providing a convenient, portable point of access for the user of the mobile device 102, where the user 102 is generally understood to include, for example, an agent, consumer, employee, or other representative or associate of the remote server 104. Therefore, the provider of the remote server 104 also has an interest in ensuring a convenience and efficiency of the user of the mobile device 102, e.g., in order to ensure a productivity and satisfaction of the user of the mobile device 102 in executing services on behalf of, or for the benefit of, the provider of the remote server 104.

In order to balance these competing interests, the system 100 provides the user of the mobile device 102 with a mobile password. In practice, the mobile password is known only to the user of the mobile device 102. Moreover, encryption algorithms which use the mobile password to encrypt data for storage at the mobile device 102 on behalf of the remote server 104 do not require storage of the mobile password itself. Consequently, in case of loss of the mobile password by the user of the mobile device 102, the user of the mobile device 102, outside of the system 100, would be unable to recover either the mobile password itself, or any data encrypted therewith. Consequently, in the absence of the techniques described herein, the user of the mobile device 102 would be required to reinstall any relevant mobile applications, and/or recover or recreate any data previously encrypted using the lost mobile password.

However, in the system 100 of FIG. 1, as described in detail herein, the mobile device 102 may be configured to leverage resources of the remote server 104, including, e.g., secure credentials provided to the user of the mobile device 102 for use in accessing the remote server 104, to recover the lost mobile password. As a result, when using the system 100 of FIG. 1, the user of the mobile device 102 may be spared the need to reinstall applications and/or recover or recreate lost data, even when the user of the mobile device 102 experiences complete loss of the mobile password. Therefore, any efficiency, productivity, and convenience of the user of the mobile device 102 may be increased, with little or no associated increase in risk to a confidentiality and integrity of associated data of the mobile device 102, or of the remote server 104.

In the example of FIG. 1, the mobile device 102 is illustrated as including at least one processor 106, non-transitory computer readable storage medium 108, and operating system 110. Of course, the mobile device 102 may be understood to include various other standard components, such as various hardware/software components related, e.g., to power management, network interfaces, display screens, and various other elements that may be included in, or associated with, various implementations of the mobile device 102. While such standard components may be referenced below to some extent for the purposes of explaining operations of the system 100, it may be appreciated that such references to such otherwise-standard mobile device components are intended to provide illustrative, non-limiting examples of implementations of the system 100 of FIG. 1, and to illustrate a transformation of a general purpose mobile computing device into the specialized mobile device of the system 100 of FIG. 1.

In this regard, then, it may be appreciated that the mobile device 102 may represent or include virtually any mobile computing device. For example, such devices include various implementations of laptop, notebook, netbook, tablet, or smartphone computing devices. Consequently, it may be appreciated that inclusion of the at least one processor 106 and the computer readable storage medium 108 would correspond to the inclusion of any suitable or appropriate such elements. Similarly, the operating system 110 may represent virtually any current or future commercially-available operating system that is suitable or appropriate for execution of the context of a particular implementation of the types of mobile devices referenced above.

In the example of FIG. 1, the mobile device 102, and the operating system 110, are illustrated as executing a mobile application 112. In the example, the mobile application 112 may be understood to be associated with a remote application 114 running on the remote server 104.

For example, the mobile application 112 may provide a subset of functionality and data of the remote application 114, for use by a user of the mobile device 102. Additionally, or alternatively, the mobile application 112 may provide various functionalities which are particularly useful to the user of the mobile device 102, or to a particular type or class of user, and which supplement or augment functionalities of the remote application 114. In further examples, the mobile application 112 may acquire, generate, and/or store data that is associated with the remote application 114. For example, the user of the mobile device 102 may acquire data during a period of time when the mobile device 102 is not connected to the remote server 104, and may synchronize or otherwise upload the acquired data to the remote server 104 when subsequently connected thereto.

In various examples described herein, the system 100 may be described as executing within the context of an enterprise or other business context. In such contexts, for example, the remote application 114 may represent, e.g., a customer relationship management application, an inventory management application, a supply chain management application, or an enterprise resource planning application. In a specific example, the remote application 114 may represent a customer relationship management application, and a user of the mobile device 102 may be a sales representative who is assigned to a defined subset of customers stored in conjunction with the customer relationship application. Thus, in the example, the mobile application 112 may manage information related to the specific subset of customers, and may provide functionalities to assist the user of the mobile device 102 in identifying, completing, and supporting sales to individual ones of the customers assigned to the user of the mobile device 102.

More generally, as referenced herein, the use of such a mobile application 112 in conjunction with a backend or remote application 114, in various contexts such as those just referenced, and in other contexts, is generally well-known. As also referenced above, the remote server 104 may be associated with an authentication engine 116, which may be configured to ensure a validity of a password or other credential provided by the user of the mobile device 102 when accessing the remote server 104. In this way, the remote server 104 may ensure secure access by the user of the mobile device 102 with respect to the remote application 114, and may thereby protect a confidentiality and integrity of data stored in conjunction with the remote application 114, illustrated in the example of FIG. 1 as being included within remote storage 118 Thus, the user of the mobile device 102 may be provided with suitable credentials, e.g., username and password, to access the remote server 104, and the remote server 104 may use various conventional techniques to ensure the confidentiality of such credentials, including conventional techniques for recovering such credentials in case of loss thereof.

Meanwhile, the mobile device 102 itself may provide certain security measures. For example, the operating system 110 may implement conventional sandbox mechanisms, perhaps in conjunction with requirements for a username/password or other credentials from the user of the mobile device 102, to thereby attempt to secure access with respect to the operating system 110 and all applications executing on the mobile device 102. However, due to the various practical limitations which exist with respect to the mobile device 102, as referenced above, the provider of the remote server 104 may not consider such security mechanisms to be suitably strong and secure.

Therefore, as shown, the mobile application 112 may include an encryption manager 120, which may be configured to implement various security measures with respect to a mobile password required by the provider of the remote server 104 of the user of the mobile device 102 for access to the mobile application 112. In particular, in example implementations described herein, the encryption manager 120 may utilize an encryption algorithm which derives a cryptographic key directly from the mobile password provided by the user of the mobile device 102, and then utilizes the derived cryptographic key to encrypt data within a data vault 122 of the mobile device 102, without requiring storage of the original mobile password at the mobile device 102. For example, the encryption manager 120 may implement the public key cryptography standard (PKCS) #5, which provides a password-based cryptography specification which, as described, is capable of determining a cryptographic key based on a provided password, and then using the derived cryptographic key to encrypt data, without requiring storage of the original mobile password.

In the example of FIG. 1, the cryptographic key derived by the encryption manager 120 from the mobile password 102, or a further derivation thereof, may be utilized to securely store data within the data vault 122, and thus may optionally be referred to herein as a data vault password. For example, the data vault 122 may thus be used to store any data acquired by the mobile application 112 which may be provided to, or otherwise used by, the remote application 114.

Similarly, the data vault 122 may be used for secure storage of subsets of data downloaded from remote storage 118. Further, the data vault 122 may be utilized to store a remote password (or other credential(s)) of the user of the mobile device 102 used to access the remote application 114. By securely storing such access credentials of the user of the mobile device 102 with respect to the remote application 114, the mobile application 112 may easily interact with the remote application 114, without requiring submission of the remote password for each such interaction with the remote server 104.

Then, in case of loss of the mobile password by the user of the mobile device 102, a mobile password recovery manager 124 may be configured to ensure the possibility of recovery of the lost mobile password, or, at least, may be configured to ensure continued access to the data stored within the data vault 122, in conjunction with setting a new mobile password to replace the lost mobile password. In particular, as described herein, the mobile password recovery manager 124 may use a suitable encryption algorithm to derive a mobile password recovery key from the remote password used to access the remote server 104. Then, the mobile password recovery key may be used to encrypt the mobile password itself, for later recovery thereof.

For example, a browser application 126 of the mobile device 102 may be utilized to interact with the user of the mobile device 102, to thereby recover and/or reset the lost mobile password. For example, as shown, mobile storage 128 associated with the browser application 126 may be utilized to store the encrypted data vault password, i.e., the data vault password as encrypted using the mobile password recovery key derived from the remote password. Then, based on the remote password, which the user of the mobile device 102 may recover, if needed, using the conventional password recovery techniques employed by the remote server, the mobile password recovery manager 124 may interact with the user of the mobile device 102 by way of the browser application 126 to thereby recover and reset the mobile password, while ensuring continuous access to data stored within the data vault 122.

Thus, in this way, the system 100 may be understood to leverage the superior resources of the remote server 104, by coupling the password or other credentials associated with the remote server 104 with the data vault password (derived from the mobile password) or other credentials used to access the data vault 122. In this way, the system 100 provides mechanisms to recover forgotten or otherwise lost mobile passwords, in a secure fashion, and without compromising the security of the data vault 122, or of the remote server 104.

Figure 2:
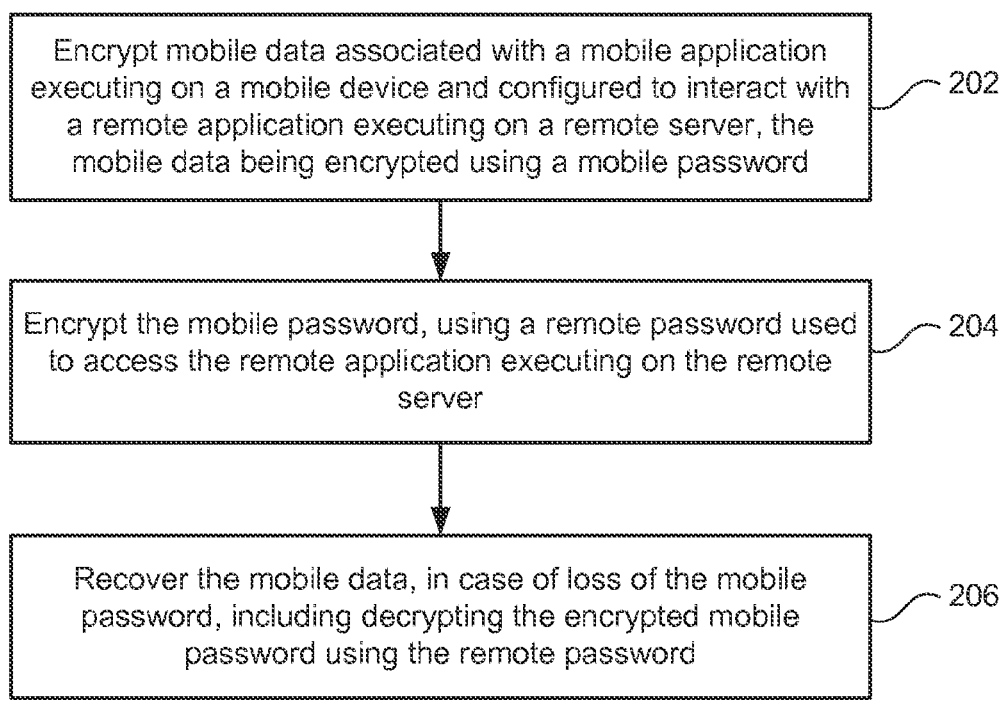
FIG. 2 is a flowchart illustrating example operations of the system of FIG. 1.

FIG. 2 is a flowchart 200 illustrating example operations of the system 100 of FIG. 1. The flowchart 200 of FIG. 2 provides a generalized, high-level representation of example operations of the system of FIG. 1 in a simplified fashion. As shown, the flowchart 200 illustrates example operations 202, 204, 206 as separate, sequential operations. However, in various additional or alternative implementations, it may be appreciated that any two or more of the operations 202-206, or additional or alternative operations not explicitly illustrated with respect to FIG. 2, may be executed in a partially or completely overlapping or parallel manner, or in a nested, iterative, looped, or branched fashion.

In the example of FIG. 2, mobile data associated with a mobile application executing on a mobile device and configured to interact with the remote application executing on a remote server may be encrypted, the mobile data being encrypted using a mobile password (202). For example, as described above with respect to FIG. 1, mobile data stored within the data vault 122 may be associated with the mobile application 112, which may itself be related to the remote application 114. Then, the encryption manager 120 may be configured to encrypt such mobile data using a mobile password provided by the user of the mobile device 102. In the example of FIG. 1, as described, the mobile password may be processed by the PKCS #5 algorithm to determine a cryptographic key, which is used by the encryption manager 120 to encrypt the mobile data within the data vault 122.

The mobile password may be encrypted, using a remote password used to access the remote application executing on the remote server (204). For example, the mobile password recovery manager 124 may be configured to process a remote password used to access the remote application 114, again using the PKCS #5 algorithm, or other suitable algorithm, to obtain a mobile password recovery key, which may then itself be used to encrypt the mobile password. In this regard, it may be appreciated that the mobile password may be encrypted directly or indirectly. For example, the mobile password recovery key derived from the remote password may be used to encrypt the mobile password, or, in other implementations, may be used to encrypt the data vault password associated with the cryptographic key derived from the mobile password, so that the mobile password is ultimately recoverable therefrom.

Thus, the mobile data may be recovered, in case of loss of the mobile password, where such recovery may include decrypting the encrypted mobile password using the remote password (206). For example, the user of the mobile device 102 may be provided with an ability to submit the remote password in conjunction with the mobile password recovery manager 124, so that the remote password may be used in conjunction with the mobile password recovery key to recover the data vault password for the data vault 122, and, if desired, to recover the original mobile password itself.

In the example of FIGS. 1 and 2, it may be appreciated that the term password, as used in conjunction, e.g., with respect to the mobile password and the remote password, may generally refer to any type of credentials, or combinations thereof, which may be utilized in the manners described above with respect to the mobile device 102 and the remote server 104. For example, in common scenarios, user authentication credentials may include a combination username and password, where it may be appreciated that either the username or password may be lost. Further, in other examples of the password or other authentication credential may be associated with additional or alternative authentication techniques, such as, for example, biometric authentication.

Figure 3:
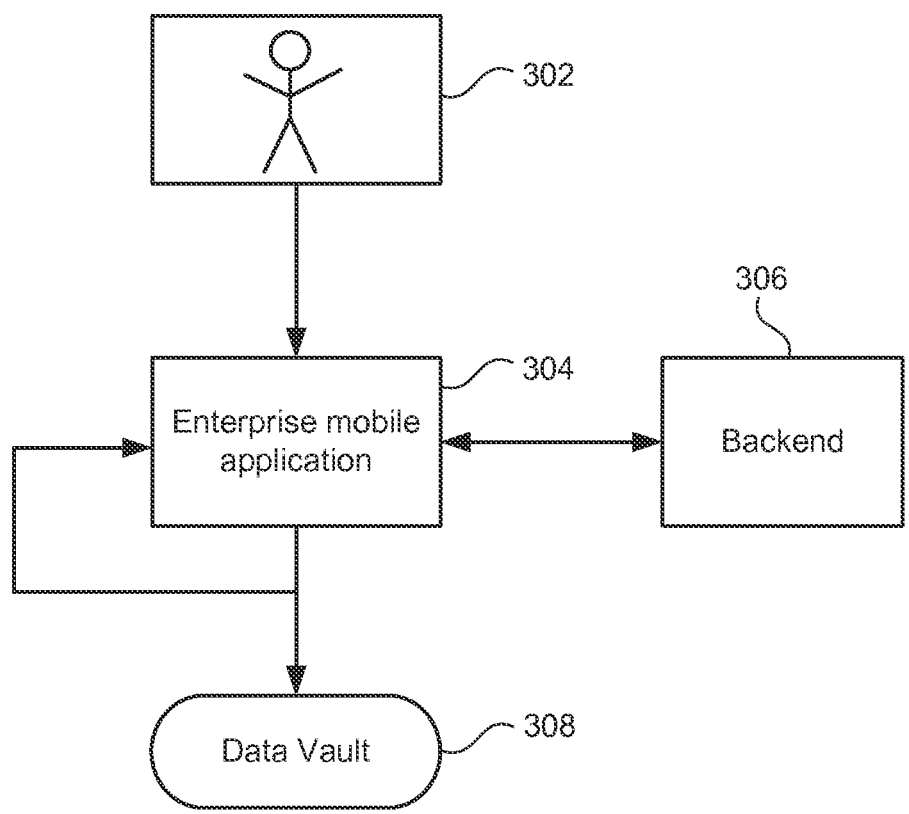
FIG. 3 is a block diagram of a system for encrypting and using a mobile password for a mobile application using the system of FIG. 1.

FIG. 3 is a block diagram of the system 300 illustrating a simplified example implementation of portions of the system 100 utilized to enable mobile password recovery. Specifically, as shown, the system 300 illustrates a user 302 of the mobile device 102, interacting with an enterprise mobile application 304, where the enterprise mobile application 304 may be understood to represent an example of the mobile application 112 of FIG. 1. As also shown, the enterprise mobile application 304 may be in communication with a backend system 306, representing an example implementation of the remote application 114. Finally in FIG. 3, a data vault 308, representing an example implementation of the data vault 122 of FIG. 1, is illustrated as being in communication with the enterprise mobile application 304.

Figure 4:
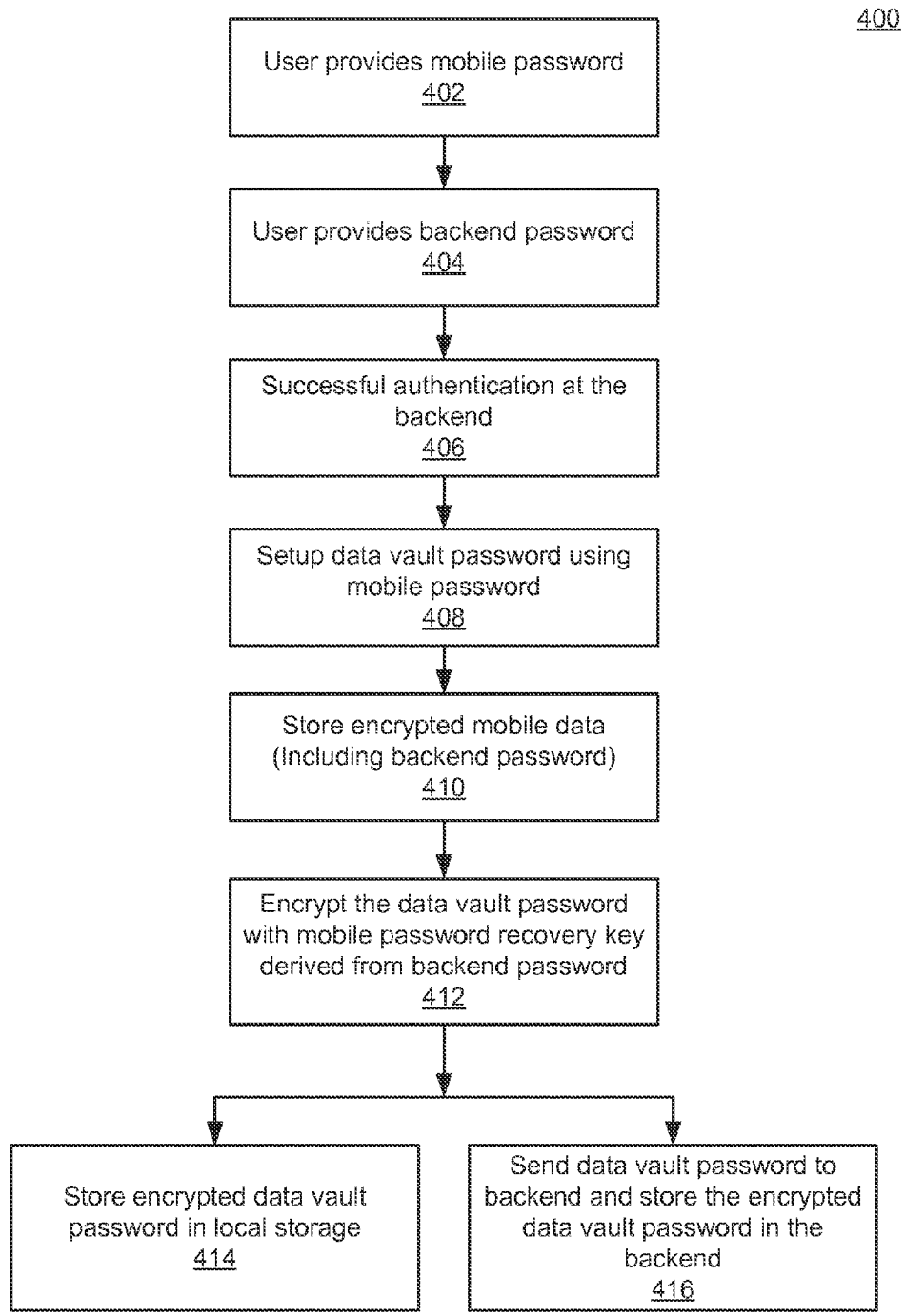
FIG. 4 is a flowchart illustrating detailed operations of the system of FIG. 3.

Operations of the system 300 of FIG. 3 may be understood in conjunction with a flowchart 400 of FIG. 4. Specifically, as illustrated in FIG. 4, the user 302 may initially provide a selected mobile password (402). For example, the encryption manager 120 may be configured to interact with the user 302 to provide a graphical user interface or other technique for receiving the mobile password, and, optionally, may ensure that the selected mobile password meets certain criteria designed to guarantee a minimum password strength.

The user 302 may then provide a backend password (404) for authenticating with respect to the backend 306. That is, it may be appreciated that the backend password in this context represents a specific example of the remote password used in conjunction with the remote application 114 in FIG. 1. In the example, it may occur that the user is required to create the backend password, but, in the case in which the user 302 has previously interacted with the backend 306 to create the backend password, the user 302 may simply enter the previously-configured backend password at the enterprise mobile application 304.

Consequently, successful authentication at the backend 306 may occur (406). Then, the selected mobile password may be processed by the PKCS number 5 algorithm (or other suitable algorithm) to derive a cryptographic key used to provide a data vault password for securing contents of the data vault 308 (408). Thus, mobile data associated with the enterprise mobile application 304, including the backend password itself, may be stored within the data vault 308 using the data vault password (410).

Then, as referenced above, the backend password may be processed using the PKCS #5 algorithm, (or other suitable algorithm), to thereby derive the mobile password recovery key, which may then be utilized to encrypt the data vault password (412). In some example implementations, the thus-encrypted data vault password may be stored in a local storage of the mobile device 102 (e.g., the mobile storage 128 of FIG. 1). For example, the mobile password may be stored in the local storage 128 of the browser application 126 (414), in conjunction with a label name based on the username of the user 302, and, as described, encrypted with the mobile password recovery key derived from the backend password.

In such scenarios, the encrypted data vault password is thus accessible to the enterprise mobile application 304, and all applications of the operating system of the mobile device, based on successful authentication at the level of the mobile operating system (e.g., the mobile operating system 110). As described in detail below with respect to FIGS. 5 and 6, the local storage, e.g., the local storage 128, may thus be accessed by way of the browser application 126, for purposes of recovering and/or resetting a lost mobile password.

In order to utilize mobile storage 128 to store the encrypted mobile password, the browser application 126 may implement various available application program interfaces (APIs) associated with the HTML 5 standard and use in conjunction with associated elements for offline web applications. For example, the local storage LSAPI, the webSQL database, and/or the offline application caching—are available for creating web applications that function offline. Thus, in the specific example, to store the encrypted mobile password, the following example of local storage code might be utilized:

| Code Portion 1 |
| --- |
| addEvent(dataInput, 'keyup', function ( ) {<br>localStorage.setItem('storage-event-test', this.value);<br>sessionStorage.setItem('user_name', this.value); // this.value will have the encrypted Enterprise Mobile Application password.<br>}); |

In additional or alternative example implementations of the flowchart 400 of FIG. 4, the data vault password may be provided to the backend 306, and the encrypted data vault password may be stored at the backend 306 (416). Such operations represent an alternative implementation, which may be considered to be more secure since the encrypted data vault password is stored at the backend 306, rather than in conjunction with the enterprise mobile application 304 itself. Of course, such additional security comes at a potential incremental cost in terms of convenience of the user 302 in accessing the encrypted data vault password for purposes of recovering a lost mobile password, since the user 302 would be required to communicate with the backend 306 as part of mobile password recovery operations.

Figure 5:
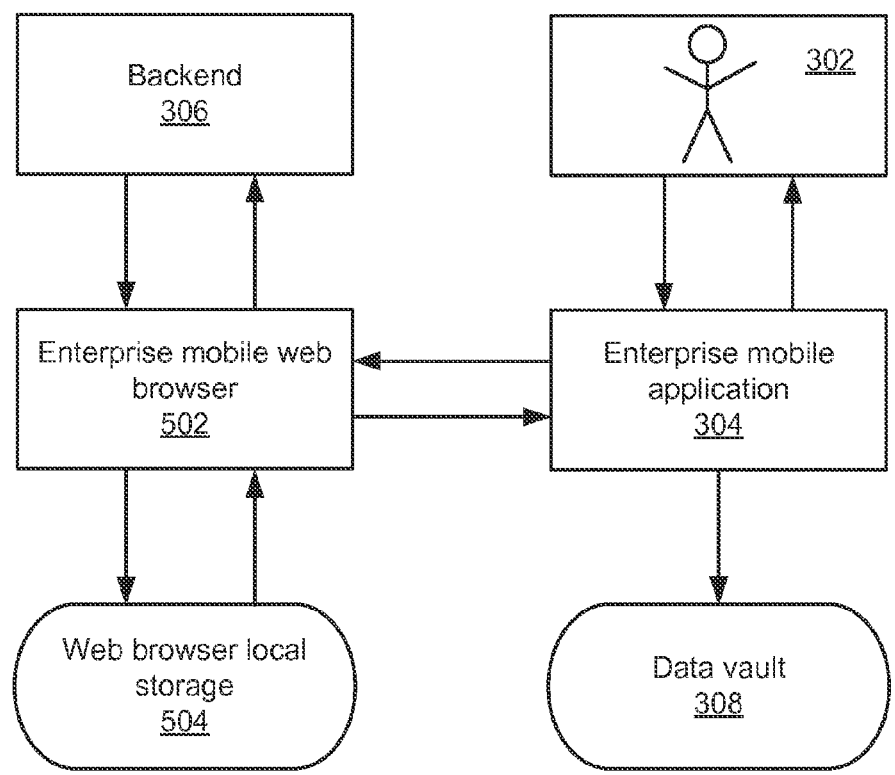
FIG. 5 is a block diagram of an example system for recovering a mobile password for a mobile application using the techniques described with respect to FIG. 1.

FIG. 5 is a block diagram of a system 500 illustrating a specific example implementation of mobile password recovery techniques described above with respect to FIGS. 1 and 2. As referenced above with respect to FIGS. 1 and 2, the enterprise mobile application 304, e.g., the mobile password recovery manager 124, may utilize an enterprise mobile web browser 502, corresponding to the browser application 126 of FIG. 1. As illustrated in FIG. 5, and discussed in more detail below with respect to FIG. 6, the enterprise mobile web browser 502 may communicate with either web browser local storage 504 and/or the backend 306, in order to utilize the mobile password recovery key derived from the backend password and used to encrypt the mobile password, to thereby recover and/or rest the lost or forgotten mobile password.

Figure 6:
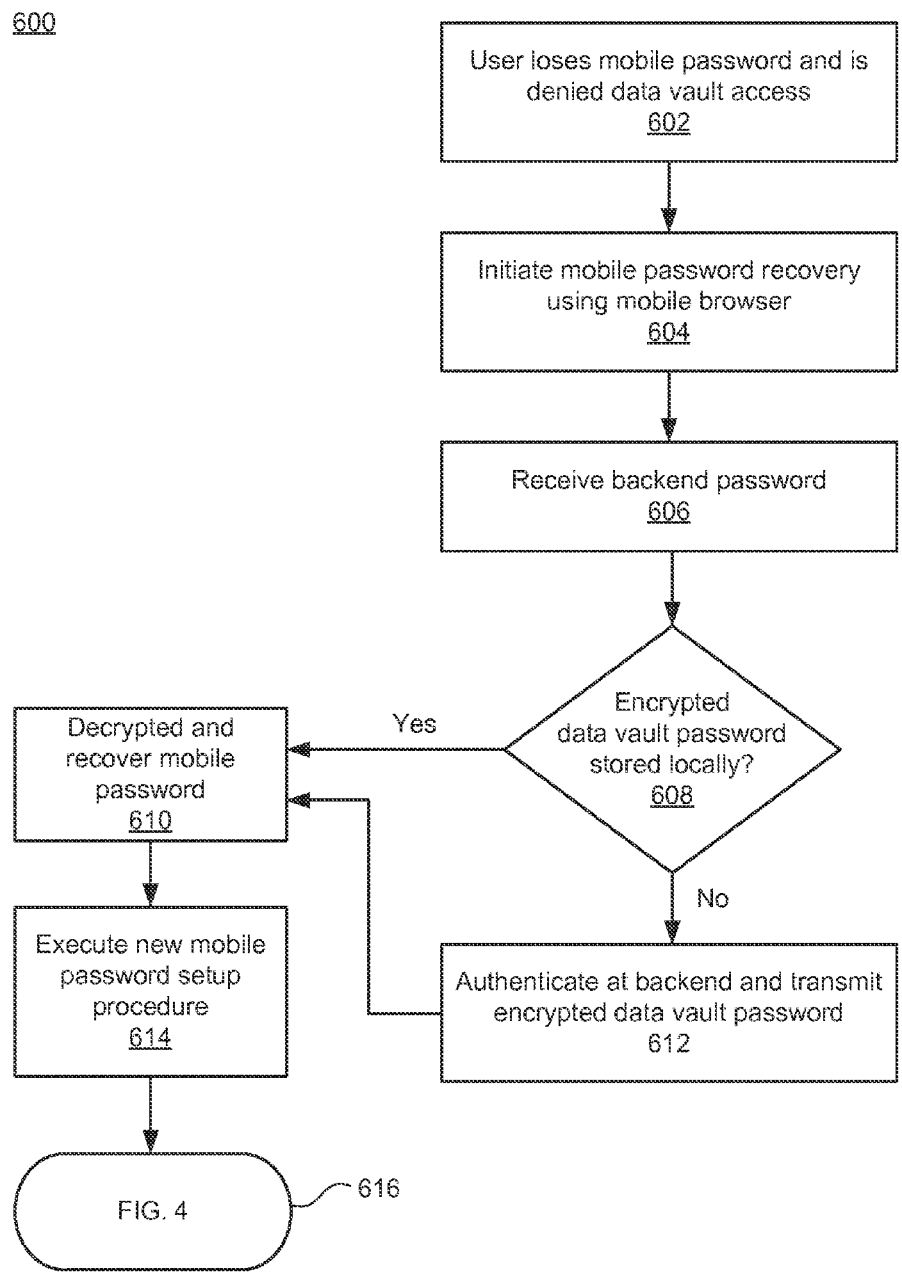
FIG. 6 is a flowchart illustrating detailed operations of the system of FIG. 5.

Thus, as illustrated in the flowchart 600 of FIG. 6, the user 302 may be understood to lose the mobile password, and thus be denied data vault access (602). For example, the user 302 may fail to authenticate at the enterprise mobile application 304. For example, some predetermined or maximum of allowed attempts may be preconfigured, whereupon reaching the maximum number of attempts by the user 302 may initiate mobile password recovery techniques, using the enterprise mobile browser 502 (604).

For example, the enterprise mobile web browser 502 may be utilized to display a webpage asking the user 102 to authenticate using the user's backend password and/or other credentials. In this way, the backend password may be received at the enterprise mobile web browser 502 from the user 302 (600).

If the encrypted data vault password is stored locally (608), then the local storage may be accessed to decrypt and recover the mobile password (610). For example, continuing the example provided above with respect to operation 414 of FIG. 4, the webpage provided to the user 302 to receive the backend password may look for an appropriate local storage (LS) variable under a username with user 302, and may attempt to decrypt the thus-located value for the encrypted data vault password using the provided backend password.

If the encrypted data vault password is not stored locally (608), then the webpage provided to the user 302 to receive the backend password using the enterprise mobile web browser 502 may proceed to authenticate at the backend 306 using the provided backend password, to thereby obtain the encrypted data vault password from the backend 306 (612). In other words, operation 612 corresponds to the operation 416 of FIG. 4, in which the data vault password and encrypted data vault password are stored at the backend 306, rather than local at the mobile device. Nonetheless, once the encrypted data vault password is available at the mobile device, decryption and recovery of the mobile password using the encrypted data vault password may precede (610).

Subsequently, a setup procedure for configuring a new mobile password may be executed (614). In the most simplified example, a recovered mobile password may simply be provided to the user 302, whereupon the user 302 might proceed to access the data vault data using the recovered mobile password. However, a generally more secure option would be to utilize the recovered mobile password to initially access data vault data, while also hiding the recovered mobile password from the user 302, and requiring the user 302 to create a new mobile password. In this context, operations may proceed as described above with respect to FIG. 4 (616), e.g., the user 302 may be required to provide a new mobile password and re-establish authenticated access to the backend based thereon (e.g., including determining a new data vault password based on the new mobile password, and thereafter encrypting the new data vault password using a new mobile password recovery key derived from the backend password, as described with respect to FIG. 4).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A mobile device comprising:
   at least one processor;
   a memory including a data vault for storing a remote password for a user of the mobile device, the remote password being received from the user for use in accessing a remote application executing on a remote server; and
   a non-transitory computer readable storage medium for storing instructions included in a mobile application including an encryption manager and a mobile password recovery manager,
   the at least one processor executing the instructions included in the mobile application causing the encryption manager to:
   derive a data vault password from a mobile password provided by the user of the mobile device; and
   securely store mobile data stored in the data vault using the data vault password, the mobile data being associated with the mobile application and utilized by the remote application; and
   the at least one processor executing the instructions included in the mobile application causing the mobile password recovery manager to:
   derive a mobile password recovery key from the remote password;
   encrypt the mobile password using the mobile password recovery key; and
   recover the mobile data, in case of loss of the mobile password, the recovery including:
   receiving, by the mobile password recovery manager and from the data vault, the remote password;
   decrypting the encrypted mobile password using the received remote password; and
   recovering the data vault password using the decrypted mobile password.

2. The mobile device of claim 1,
   wherein the instructions included in the mobile application that when executed by the at least one processor cause the encryption manager to derive the data vault password from the mobile password further include instructions to derive a key from the mobile password, and
   wherein the instructions included in the mobile application that when executed by the at least one processor cause the encryption manager to securely store the mobile data in the data vault using the data vault password further include instructions to encrypt the mobile data using an encryption algorithm that does not require storage of the mobile password on the mobile device.

3. The mobile device of claim 1,
   wherein the non-transitory computer readable storage medium further stores instructions included in a browser application, the instructions included in the browser application being executed by the at least one processor; and
   wherein receiving the remote password includes receiving the remote password from the user of the mobile device interacting with the browser application.

4. The mobile device of claim 2, wherein the instructions included in the mobile application when executed by the at least one processor further cause the mobile password recovery manager to encrypt the key derived from the mobile password using the mobile password recovery key, the encrypting using an encryption algorithm that does not require storage of the mobile password on the mobile device.

5. The mobile device of claim 1, wherein the instructions included in the mobile application that when executed by the at least one processor cause the mobile password recovery manager to encrypt the mobile password using the mobile password recovery key further include instructions to use an encryption algorithm that does not require storage of the mobile password on the mobile device.

6. The mobile device of claim 1, wherein the encrypted mobile password, and/or a key derived from the mobile password, is stored using local storage of a browser application of the mobile device.

7. The mobile device of claim 6, wherein the instructions included in the mobile application when executed by the at least one processor further cause the mobile password recovery manager to:
   receive the remote password by way of the browser application, and
   decrypt the mobile password, and/or the key derived from the mobile password, using the mobile password recovery key.

8. The mobile device of claim 1, wherein the mobile password, and/or a key derived from the mobile password, is stored at the remote server, and further wherein the encrypted mobile password, or encrypted key derived from the mobile password, is also stored at the remote server.

9. The mobile device of claim 8, wherein the instructions included in the mobile application that cause the mobile password recovery manager to recover the mobile data further include instructions that when executed by the at least one processor cause the mobile password recovery manager to:
   receive the remote password by way of a browser application of the mobile device, and
   communicate with the remote server to decrypt the encrypted mobile password using the mobile password recovery key.

10. The mobile device of claim 1, wherein the instructions included in the mobile application when executed by the at least one processor further cause the mobile password recovery manager to:
    recover the mobile data without providing the decrypted mobile password to the user of the mobile device, and enforce a password re-set procedure to obtain a new mobile password from the user.

11. A computer-implemented method for executing instructions stored on a non-transitory computer readable storage medium, the method comprising:
storing, in a data vault included in a mobile device, a remote password for a user of the mobile device, the remote password being received from the user for use in accessing a remote application executing on a remote server;
deriving, by the mobile device, a data vault password from a mobile password provided by the user of the mobile device;
securely storing, by the mobile device, mobile data in the data vault using the data vault password, the mobile data being associated with a mobile application executing on the mobile device;
accessing, by the mobile device, the remote application executing on the remote server;
deriving, by the mobile device, a mobile password recovery key from the remote password;
encrypting, by the mobile device, the mobile password, the encrypting using the mobile password recovery key; and
recovering, by the mobile device and in case of loss of the mobile password, the mobile data, the recovering including:
retrieving the remote password from the data vault;
decrypting the encrypted mobile password using the received remote password; and
recovering the data vault password using the decrypted mobile password.

12. The method of claim 11, wherein securely storing the mobile data comprises:
encrypting the mobile data using a key derived from the mobile password using an encryption algorithm that does not require storage of the mobile password.

13. The method of claim 11, wherein encrypting the mobile password using the mobile password recovery key uses an encryption algorithm that does not require storage of the mobile password.

14. The method of claim 11, wherein recovering the mobile data further includes:
recovering the mobile data without providing the decrypted mobile password to the user of the mobile device; and
enforcing a password re-set procedure to obtain a new mobile password from the user.

15. A computer program product, the computer program product being tangibly embodied on a non-transitory computer-readable storage medium and comprising instructions that, when executed by at least one processor, are configured to:
store, in a data vault included in a mobile device, a remote password for a user of the mobile device, the remote password being received from the user for use in accessing a remote application executing on a remote server;
derive a data vault password from a mobile password provided by the user of the mobile device;
securely store mobile data in the data vault using the data vault password, the mobile data being associated with a mobile application executing on the mobile device;
derive a mobile password recovery key from the remote password;
encrypt the mobile password using the mobile password recovery key; and
recover the mobile data, in case of loss of the mobile password, the recovery including:
retrieving the remote password from the data vault;
decrypting the encrypted mobile password using the received remote password; and
recovering the data vault password using the decrypted mobile password.

16. The computer program product of claim 15, wherein the instructions, when executed by the at least one processor, are further configured to encrypt the mobile data using a key derived from the mobile password using an encryption algorithm that does not require storage of the mobile password.

17. The computer program product of claim 16, wherein the instructions, when executed by the at least one processor, are further configured to:
encrypt the mobile password including encrypting the key derived from the mobile password; and
encrypt the key derived from the mobile password using the mobile password recovery key, the encrypting using an encryption algorithm that does not require storage of the mobile password.

18. The computer program product of claim 15, wherein the instructions, when executed by the at least one processor, to encrypt the mobile password using the mobile password recovery key further includes instructions that when executed by the at least one processor, are further configured to use an encryption algorithm that does not require storage of the mobile password.

19. The computer program product of claim 15, wherein the mobile password, and/or a key derived from the mobile password, is stored at the remote server, and further wherein the encrypted mobile password, or encrypted key derived from the mobile password, is also stored at the remote server.

20. The computer program product of claim 15, wherein the instructions, when executed by the at least one processor, are further configured to:
recover the mobile data without providing the decrypted mobile password to the user of the mobile device; and
enforce a password re-set procedure to obtain a new mobile password from the user.

* * * * *